United States Patent
Joseph et al.

(10) Patent No.: US 7,576,754 B1
(45) Date of Patent: Aug. 18, 2009

(54) SYSTEM AND METHOD FOR IDENTIFYING BOUNDS OF A GEOGRAPHICAL AREA

(75) Inventors: Joshy Joseph, Los Altos Hills, CA (US); Sridhar Ramaswamy, Cupertino, CA (US); Mark Rose, Los Altos, CA (US)

(73) Assignee: Google Inc., Mountain View, CA (US)

( * ) Notice: Subject to any disclaimer, the term of this patent is extended or adjusted under 35 U.S.C. 154(b) by 397 days.

(21) Appl. No.: 11/399,949

(22) Filed: Apr. 7, 2006

Related U.S. Application Data

(60) Provisional application No. 60/731,460, filed on Oct. 27, 2005.

(51) Int. Cl.
*G09G 5/00* (2006.01)
*G09G 5/02* (2006.01)
*H04L 29/06* (2006.01)
*G01C 21/26* (2006.01)
*G09B 29/10* (2006.01)
*B64C 13/00* (2006.01)

(52) U.S. Cl. .......... 345/619; 345/645; 345/671; 715/213; 715/788; 715/790; 715/800; 701/208; 701/212; 701/214; 701/206; 702/1

(58) Field of Classification Search .......... 345/619–620, 345/643, 645, 660, 671; 715/213, 216, 218, 715/241, 246, 247, 788, 790, 800–801, 815, 715/866; 701/200, 212, 206–208, 214–216; 707/3, 14

See application file for complete search history.

(56) References Cited

U.S. PATENT DOCUMENTS

| | | | |
|---|---|---|---|
| 5,796,634 A | 8/1998 | Craport et al. | 364/559 |
| 6,075,467 A | 6/2000 | Ninagawa | |
| 6,498,863 B1 | 12/2002 | Gaidoukevitch et al. | 382/173 |
| 6,574,554 B1 | 6/2003 | Beesley et al. | |
| 7,185,138 B1* | 2/2007 | Galicki | 710/316 |
| 2001/0013013 A1 | 8/2001 | Takenaga | 705/14 |
| 2001/0016796 A1 | 8/2001 | Ata et al. | |
| 2002/0046212 A1 | 4/2002 | Meifu et al. | 707/104.1 |
| 2002/0151315 A1 | 10/2002 | Hendrey | 455/466 |
| 2003/0036842 A1* | 2/2003 | Hancock | 701/200 |
| 2003/0074136 A1* | 4/2003 | Hancock et al. | 701/213 |
| 2003/0158661 A1 | 8/2003 | Chen et al. | |
| 2003/0199269 A1* | 10/2003 | Tobe et al. | 455/422.1 |

(Continued)

OTHER PUBLICATIONS

Office Action prepared by Examiner Mark F. Szajna for related case (U.S. Appl. No. 11/399,950), mailed from USPTO on Sep. 5, 2008.

*Primary Examiner*—Wesner Sajous
(74) *Attorney, Agent, or Firm*—Park, Vaughan & Fleming LLP

(57) ABSTRACT

A system and method for determining bounds of a geographical area, such as a city, metropolis, region (e.g., state) or country. From a set of coordinates within the area (e.g., latitude/longitude coordinates), a grid of relatively small cells of geographic data is overlaid upon those coordinates and associated with the area. Each initial cell is iteratively replaced with a larger cell that encompasses the initial cell until the replacement cell intersects a cell associated with some other geographical area or some other boundary condition is met (e.g., a threshold number of replacements).

29 Claims, 8 Drawing Sheets

U.S. PATENT DOCUMENTS

| | | |
|---|---|---|
| 2004/0030493 A1 | 2/2004 | Pechatnikov et al. ........ 701/208 |
| 2004/0073538 A1 | 4/2004 | Leishman et al. |
| 2004/0172191 A1 | 9/2004 | Vitikainen et al. .......... 701/208 |
| 2005/0102101 A1 | 5/2005 | Beesley et al. |
| 2005/0283503 A1* | 12/2005 | Hancock et al. ............. 707/200 |

* cited by examiner

SYSTEM AND METHOD FOR IDENTIFYING BOUNDS OF A GEOGRAPHICAL AREA

RELATED APPLICATIONS

This application claims priority to U.S. Provisional Application No. 60/731,460, filed Oct. 27, 2005, which is hereby incorporated by reference. This application is related to U.S. patent application Ser. No. 11/400,701, entitled "System and Method for Identifying Geographical Areas that Significantly Overlap a Map View", and U.S. patent application Ser. No. 11/399,950, entitled "System and Method for Selecting Targeted Information for Serving with a Map View", both of which were filed Apr. 7, 2006.

BACKGROUND

This invention relates to the field of computer systems. More particularly, a system and methods are provided for determining bounds of a geographical area based on the location of a city or cities within the area.

Mapping software is very popular with many computer users, who may rely upon it for obtaining directions, becoming familiar with a new area, finding points of interest, locating a business establishment, etc. Existing methods of electronically displaying maps are typically capable of locating and displaying a specific address or landmark (e.g., an airport) within a particular geographical area (e.g., a city, a state, a country). However, they are generally not capable of identifying or determining boundaries of the geographical area, and may therefore be unable to provide supplemental information (e.g., advertisements, descriptions of sites of interest) pertaining just to that area.

For example, advertisers are often interested in having advertisements for their establishments or products displayed for users who open an electronic map to view an area in which their establishment is located or their product is available. Thus, a hotel or restaurant may wish to have an advertisement served with (e.g., overlaid upon) a map centered within some distance of their location.

However, the area covered by the user's view port may overlap multiple cities, metropolitan regions or other areas that the advertiser is not interested in or that are not covered by the advertiser's agreement with the map provider or service. Or, the advertiser may want its advertisement served with maps covering a general area (e.g., a city, a metropolitan region). In either scenario, it is necessary to determine whether a map display provided to a user overlaps an advertiser's area(s) of interest and, possibly, whether it overlaps more or less than a threshold amount.

Unfortunately, mapping software cannot readily determine where one geographical area (e.g., city, metropolitan region) ends and another begins. Even if the data used to display an area shows purported boundaries (e.g., if the electronic map is simply a copy of a printed map), those boundaries are not coded in a manner decipherable by the software (e.g., as latitude/longitude coordinates).

If the mapping algorithm or software is not capable of identifying boundaries of geographical areas, then it cannot properly limit the display of a particular advertisement to appropriate map views, and may not be able to determine which advertisements to display for a particular view.

Similarly, if a mapping algorithm or tool cannot identify the boundaries or extent of a geographical area, then the algorithm or tool will also be incapable of determining which areas overlap a map view. This will also negatively affect the ability to select and/or display advertisements appropriate to the view.

Yet further, even if a mapping tool was capable of identifying boundaries of geographical areas, and could determine whether a particular area overlapped a user's view of a map, it may not be desirable to automatically display all advertisements associated with all overlapping areas. For example, if an advertiser's target area of interest overlaps only a very small portion of the user's view, then it may be preferable for an advertisement associated with that area to be omitted, or lowered in priority with regard to advertisements associated with areas comprising much larger portions of the view.

SUMMARY

In one embodiment of the invention, a system and methods are provided for determining bounds of a geographical area, such as a city, metropolis, region (e.g., state) or country. From a set of coordinates within the area (e.g., latitude/longitude coordinates), a grid of relatively small cells of geographic data is overlaid upon those coordinates and associated with the area. Each initial cell is iteratively replaced with a larger cell that encompasses the initial cell, unless the replacement cell intersects a cell associated with some other geographical area, or until some other boundary condition is met (e.g., a threshold number of replacements is performed).

In an embodiment of the invention, any number of cities, metropolises, regions and countries are selected to have their boundaries determined. Each smaller area (e.g., city) is identified as being within a specific larger area of each type (e.g., metropolis, region, country) if possible. For example, the city of Hollywood, Calif. may be logically placed within the metropolis of Los Angeles, the region of California and the country of the United States. However, some cities may not be part of any metropolis or region.

In this embodiment, city boundaries are determined first, then boundaries of larger areas. For each selected city, some point is identified as a starting point (e.g., the latitude/longitude of the city center). Multiple relatively small geographic cells that surround each city's starting points are then identified. Those cells are iteratively expanded in size until they collide with cells of other cities or cells containing no land (e.g., ocean), until a threshold number of expansions have been performed, or until some other terminating condition is encountered (e.g., the total area encompassed by a city's cells exceeds some threshold size).

Illustratively, all cells at a given level of replacement are considered for replacement with a larger cell before any larger cells are considered. When the replacement scheme is terminated, the cities may then be defined by their associated cells, and their bounds are defined by their perimeter of cells and/or by the locations of intersections between cities' cells.

Bounds of the selected metropolises may be identified in a similar fashion, starting with coordinates for one or more cities within the metropolises. Initial cells for those cities are then expanded until they collide with cells associated with other metropolises (e.g., cells expanded from cities in other metropolises) or cells associated with cities that are not part of any metropolis, until a threshold number of expansions has been performed, etc.

Bounds of the selected regions may be identified similarly, starting with coordinates of all selected cities within the region. Initial cells for those cities are then expanded until they collide with cells associated with other regions (e.g., cells expanded from cities in other regions), until a threshold number of expansions has been performed, etc.

Bounds of the selected countries may be identified similarly, starting with coordinates of all selected cities within the country. Initial cells for those cities are then expanded until they collide with cells associated with other countries (e.g., cells expanded from cities in other countries), until a threshold number of expansions has been performed, etc.

In one alternative embodiment of the invention, boundaries of smaller areas (e.g., cities) may be used as starting points for determining the bounds of larger areas (e.g., regions).

In an embodiment of the invention, the geographic cells used to build an area's boundaries may be derived by projecting faces of an imaginary cube onto the earth's surface to produce a first level of cells. Each of the six projections is then divided into four equal portions to create second level cells. Subdivision of each cell into four equal cells of the next lower level may continue for any number of iterations. In one implementation, a total of approximately 30 levels of cells are defined.

DETAILED DESCRIPTION

Figure 1:
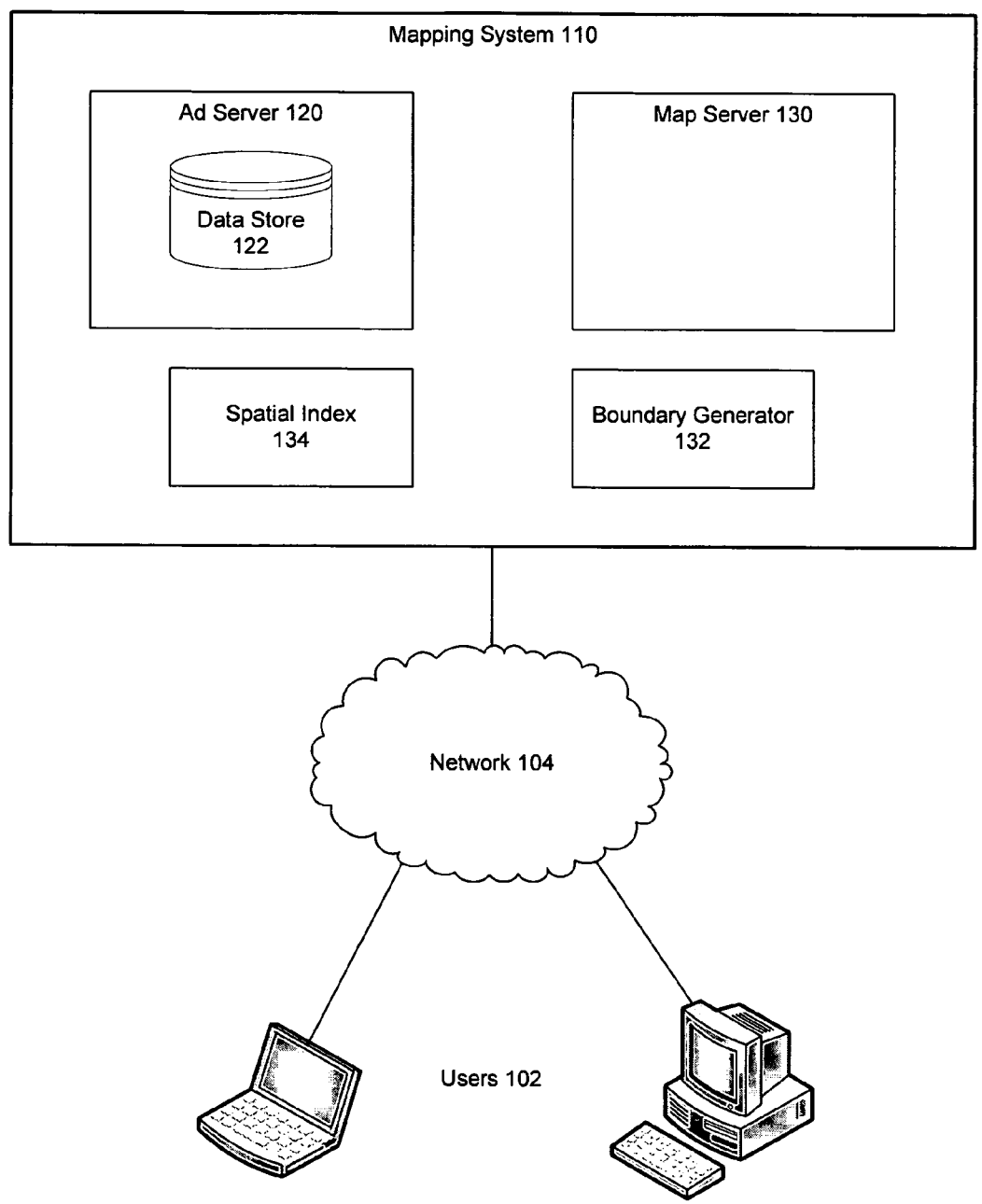
FIG. 1 is a block diagram depicting a computing environment for implementing an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Introduction

Embodiments of the invention described herein facilitate the identification or selection of advertisements, announcements and/or other messages to be displayed to users or viewers of an electronic map. The map may encompass or overlay virtually any geographical area(s) and may be used for virtually any purpose, such as navigation (e.g., driving directions), searching for a particular type of business (e.g., a shopping mall, a restaurant), locating landmarks or sites of interest (e.g., parks, airports), etc. An embodiment of the invention may be implemented with a map derived from imagery (e.g., aerial, satellite), from rendering of a printed map, from other sources or any combination of sources.

In one embodiment of the invention, a system and method are provided for determining a geographical area's bounds, to facilitate a determination as to whether a map view (or view port) intersects the area. The area may be a city, a metropolis (e.g., metropolitan area), a region (e.g., a state, a county), a country, etc.

In one implementation of this embodiment, areas are first associated with points or sets of points within the areas (e.g., latitude/longitude coordinates of city centers). Areas are then iteratively increased in size until a collision occurs with a neighboring area or some other terminating condition arises, at which time the expansion in the direction of the collision is stopped. By repeating this process until a perimeter is defined (i.e., by collisions), an outline of the area is identified. Illustratively, if no geographical data are available in a particular direction, or a topographical feature is encountered (e.g., an ocean), expansion in that direction may halt without a collision.

In another embodiment of the invention, the boundaries of one or more geographical areas are used to determine whether and how much an area overlaps a user's map view or view port. In this embodiment, a number of points or zones are defined within the view port. Intersections between the points or zones and one or more geographical areas may then be calculated to determine which areas overlap the view port and possibly estimate how much they overlap.

In yet another embodiment of the invention, advertisements associated with particular geographical areas are selected for serving with a view port based on whether and/or how much those areas overlap the view port. Illustratively, advertisements to be served with a view port may be selected based on the geographical area(s) within the view port. However, an advertisement associated with an area that comprises a tiny portion of the view port may be omitted or reduced in priority compared to an advertisement associated with an area that covers a large majority of the view port.

Embodiments of the invention described below may be implemented by map providers, advertisers and/or other organizations. For example, a map provider may select or generate a map view based on a user's request, then query an ad server for ads appropriate to the user's view port and serve the map and ads together.

FIG. 1 is a block diagram of a computing environment in which an embodiment of the invention may be implemented.

In FIG. 1, users 102 operate any type or types of client devices that are capable of displaying a view of an electronic map (e.g., computers, personal digital assistants, smart phones). The user's view of a map may be termed a map view or view port. Users' client devices are coupled to network 104 and/or other communication links coupled to mapping system 110, which comprises ad server 120 and map server 130. The components of mapping system 110 may be physically and/or logically distributed. In one embodiment of the invention, network 104 comprises the Internet.

Ad server 120 selects ads from data store 122 for serving to users, based on criteria such as a user's map view, search query, language, etc. Criteria for selecting an ad may be received from map server 130 and/or other sources (e.g. a web server through which a user accesses the functions of mapping system 110).

Data store 122 stores information regarding targeting constraints of ads, such as when or to which users a particular ad should or should not be served. For example, one or more geographic areas may be associated with an ad, so that the ad is only (or preferably) served with map views that include or overlap with the associated area(s).

Data store 122 also stores geographic information about cities, metropolises, regions (e.g., states), countries and/or other target geographic areas or locations associated with ads handled by the ad server. The data store records relationships between these areas, such as which larger area (e.g., region, country) a particular smaller area (e.g., city, metropolis) is part of, and which smaller areas (e.g., cities) are part of a particular larger area (e.g., metropolis, region, country).

The data store may also include latitude/longitude coordinates associated with any of these areas, particularly cites. Illustratively, the latitude/longitude coordinate of a city may correspond to the center of the city.

Map server 130 is responsible for displaying map views and ads, based on factors such as user input, ad parameters, video resolution, display device and so on. Ads to be served to users are received by map server 130 from ad server 120 via RPC (Remote Procedure Call) or other suitable means.

Boundary generator 132 is configured to determine a boundary of a geographic area or location reflected in data store 122, and may also be configured to generate or retrieve coordinates (e.g., latitude/longitude coordinates) of an area (e.g., from the data store).

Spatial index 134 comprises an index of all the geographic areas or locations reflected in data store 122, and may be constructed by boundary generator 132, or from data generated by the boundary generator. The spatial index may also be used to compare an advertiser's area of interest with a user's view port of a map, and may determine whether, and possibly how much, the area of interest overlaps the view port. As described below, the spatial index may be organized as a hierarchical collection of nodes corresponding to geographic cells or zones.

Determining Bounds of a Geographical Area

In an embodiment of the invention, a boundary is determined for a geographical area, which may be a city, a metropolis, a region (e.g., a county or state) or a country. In other implementations, boundaries of areas of other scopes may be determined. Area boundaries may be computed in advance of users' queries for maps or map views, or may be computed as needed.

This embodiment of the invention makes use of a spatial index (e.g., spatial index 134 of FIG. 1), a database or other collection of geographic or geospatial data covering all areas whose bounds are to be determined. For example, some or all of the earth's surface may be divided into cells of data.

In this example, the six faces of a cube encompassing the earth are projected onto the earth. Those six projections become the top layer cells (i.e., layer 1) in the hierarchy because they reflect the first geographical division of the earth's surface. The spatial index thus includes six nodes at level one, corresponding to the six initial cells.

Each first layer cell is then subdivided in quad-tree fashion into four child cells at the next layer. This subdivision scheme may be repeated as many times as desired, to generate any number of layers of cells.

At each successive layer or level, cells decrease in size and increase in number. Illustratively, cells that comprise only water or that do not comprise any geographic area of interest are not further subdivided. For example, at least one coordinate (e.g., one latitude/longitude point) may be known for each area of interest. If a given cell encompasses none of those points, it may not be further subdivided. A set of geographical areas of interest may be derived from the areas reflected in a data store such as data store 122 of FIG. 1 (e.g., target areas of advertisements or other information).

In one embodiment of the invention, this subdivision may be repeated until approximately 30 layers of cells are defined (e.g., layers 1-30). With the earth as the starting sphere, this yields leaf cells covering approximately one square centimeter. However, cells at a given level M may not all be the same size. For example, geographic cells near the equator will be longer in their longitudinal dimension than cells at the same level located nearer either pole.

The data can be stored or arranged as a tree having a root (e.g., layer 0) that represents the entire realm of data (e.g., the earth, a continent), leaf cells (e.g., at layer N), and any number of intermediate layers or levels of cells. Cells at "higher" layers (e.g., layers 1, 2) are closer to the root and cover larger areas than cells at "lower" layers (e.g., layer N−1) closer to the leaf cells. A hierarchical spatial index can then be constructed with nodes corresponding to the cells.

In another implementation, different cell division schemes may be applied with different starting areas (e.g., different continents), different initial cell definitions (e.g., dividing each upper layer cell into nine lower layer cells instead of four), etc.

FIGS. 2-5 demonstrate methods of determining bounds of geographical areas according to an embodiment of the invention. Other embodiments may be derived from the following descriptions without exceeding the scope of the invention.

Figure 2:
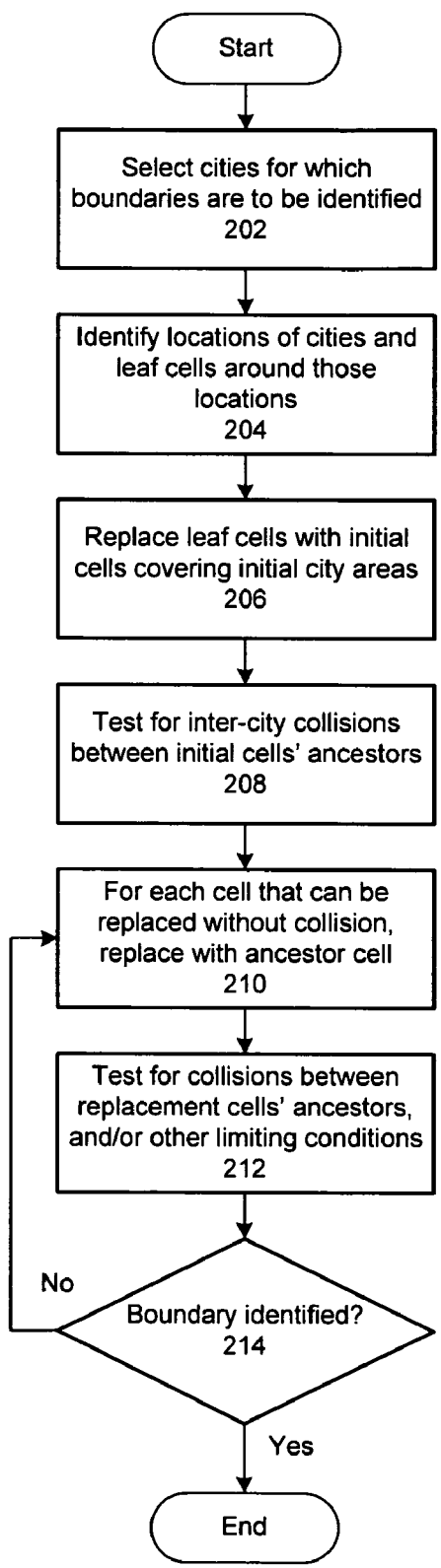
FIG. 2 is a flowchart illustrating a method of determining a boundary of a city in accordance with an embodiment of the invention.

FIG. 2 demonstrates a method of determining the bounds of cities. In operation 202, the cities for which bounds are to be determined are identified. Any number of cities may be selected, such as all cities associated with advertisements or other information that may be served with a user's map view.

In operation 204, locations of those cities are identified. For example, longitude and latitude coordinates for each city may be determined by retrieving them from storage (e.g., data store 122 of FIG. 1), looking them up in a suitable geospatial database, etc. A city's coordinates may correspond to the city's center (e.g., geographical center, downtown, political center), but need not be exact.

Also in operation 204, a grid of leaf cells of geographical data that cover each city's coordinates is identified. The size of the leaf cells will depend upon how many levels or layers were defined in the hierarchy of cells and the corresponding spatial index (i.e., at what level of the hierarchy the leaf cells reside).

In one implementation in which the spatial index comprises approximately 30 layers, a city's coordinates may be used to lookup a central leaf cell for the city that encompasses those coordinates. Then, eight additional leaf cells that adjoin the central leaf cell in all directions (i.e., horizontally, vertically and on both diagonals) are also identified unless, possibly, they are undefined (i.e., consist of no geographic or geospatial data) or comprise ocean or other topographical features that are not considered. Thus, in this implementation, 3×3 grids of leaf cells (i.e., nine leaf cells) covering all or a portion of each city are now defined.

In one alternative implementation, some other number of cells is placed over the cities' coordinates, and may be leaf cells or cells at any other level of the spatial index hierarchy. For example, the latitude/longitude coordinates of a city may be used to identify the central intersection of a 2×2 or 4×4 grid of cells.

In operation 206, the cities' grids of leaf cells are replaced with initial ancestor cells at a default or specified level in the spatial index hierarchy, in order to cover an initial area of a desired size. As described below, cities' initial areas will be iteratively expanded until some terminating condition is satisfied, at which time their boundaries will have been delineated.

In the illustrated embodiment of the invention, if the desired starting area for a city for calculating its boundaries is approximately one square mile, leaf cells comprising the city's 3×3 grid of leaf cells (e.g., at level 30) are replaced with initial cells at such a level (e.g., level 13) that the combined size of the initial cells is approximately one square mile.

Different cities may have initial areas of different sizes. Therefore, the spatial index level of cells used to construct the (e.g., 3×3) grid of leaf cells in operation 204 and/or the initial city cells in operation 206 may be different for different cities. For example, if it is known that a city is of a particular size or within a particular size range, the layer from which initial cells are selected to construct its starting area may be selected accordingly.

Also, cities' initial cells are selected so that no initial cell is associated with more than one city.

In operation 208, any or all of the cities are tested to determine if any of their initial cells would collide (e.g., overlay, intersect) if replaced with their immediate ancestors. In the illustrated method, a collision occurs if cells of two or more different cities would be replaced with the same ancestor cell.

Therefore, a given cell at level N will not be replaced with its level N–1 ancestor cell if two or more of the N–1 ancestor's descendants belong to different cities. More specifically, in this embodiment, any given cell and all of its descendants belong to at most one city.

The size of a city's initial cells may make unlikely for a collision to occur at this stage, especially if only relatively large or popular cities were selected in operation 202, as they would likely be far enough apart that their initial cells' ancestors are distinct from each other.

In operation 210, each cell (e.g., at layer N) that can expand without collision is replaced with the next larger cell (i.e., the cell at layer N–1 that includes the cell). Thus, multiple adjacent cells having the same immediate ancestor may be replaced with a single larger cell.

In one implementation, a cell at a given level (or set of adjacent cells having the same ancestor) also may not be replaced or expanded if it is known that the next larger cell comprises no useful geospatial or geographic data not already covered by the existing cells. For example, if the only content of the next larger cell not covered by existing cells is undefined (e.g., no data available), does not include or is not part of any geographical area of interest, or comprises ocean or some other limiting or non-land topographical feature, those existing cells may not be replaced.

Each time cells at one layer of the data tree are to be replaced with cells at the next higher layer, replacements are attempted for all cities before moving on to the next round of replacements. In other words, all cells at a given level M that can be replaced or expanded without collision, are replaced with their level M–1 ancestor cells before any level M–1 cells are considered for replacement or expansion. This ensures that each city's bounds are allowed to grow at the same rate.

In operation 212, it is determined whether any of the replacement cells would collide if expanded. When a cell of one city cannot be expanded or replaced without colliding with another city, it can be determined that a boundary between the two cities has been detected. The boundary at the cells that collided may be derived from one of the colliding cells (e.g., one of its sides or corners, a midpoint of a side of the cell), midpoints of the colliding cells, or in some other manner.

Expansion of cells, or replacement of cells with larger cells, may also halt for reasons other than collisions. For example, in one implementation, expansion may halt automatically after a given number of iterations of cell replacements, even if a collision has not yet occurred. This would prevent a city's boundaries from expanding so far that they encompass an unreasonably large area.

In another implementation, expansion or replacement of a cell associated with a city may cease when the other three of its ancestor cell's four descendants are unassigned. In this implementation, an unassigned cell is a cell that is not associated with any area of interest (e.g., any city, metropolis, region or country associated with information served to users with map views). For example, unassigned cells may cover water (e.g., ocean, lake) or land that does not include any cities of interest.

In another implementation, expansion may cease for a city based on some categorization of the city. For example, some or all cities may be categorized based on size (e.g., large, medium, small), population, population density or other factor(s). In this case a determination may be made that all residents of the city, or some high percentage thereof, likely reside within a particular distance of the city's coordinates. Expansion may halt when that distance from the city's coordinates has been reached.

In yet another implementation, phantom cities or other areas may be defined to act as stopping points for cell expansion or replacement. For example, one or more phantom cities associated with no metropolis or a phantom metropolis may be placed around an island that includes a city (e.g., Honolulu). As cells associated with the city are expanded, if a collision is detected with a phantom city then expansion of the city's bounds is halted in that direction. Cells of a phantom area may or may not be expanded when determining boundaries of cities and/or other areas.

In operation 214, it is determined whether sufficient boundaries have been delimited for all cities of interest. In one implementation, when no cells of a particular city can be expanded or enlarged any further (e.g., because they would collide with cells from other cities), then a boundary of that city has been identified. The actual bounds assigned to the city may be derived from an outline of the cells, by a line connecting their midpoints or points of collision, etc.

In an embodiment of the invention, cities' bounds may be used as the starting point for finding bounds of larger areas, such as metropolises, regions (e.g., states) and countries.

Figure 3:
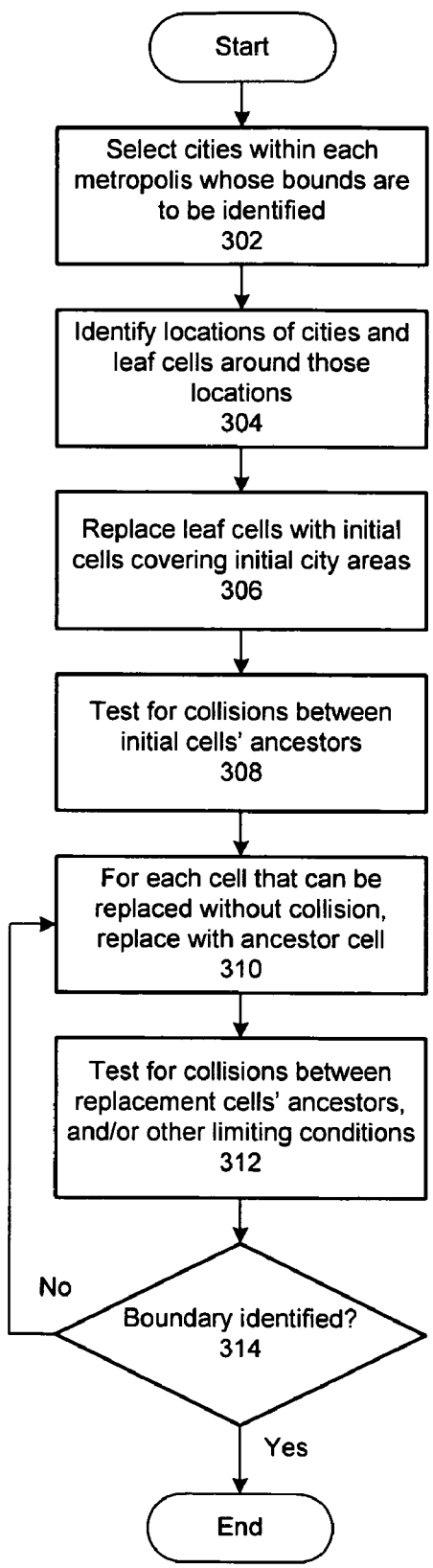
FIG. 3 is a flowchart illustrating a method of determining a boundary of a metropolis in accordance with an embodiment of the invention.

FIG. 3 demonstrates a method of identifying bounds of one or more metropolises, according to an embodiment of the invention.

In operation 302, one or more cities deemed to lie within the boundaries of each metropolis are identified. A metropolis may be based on a single city (e.g., New York city) or multiple cities (e.g., Minneapolis and St. Paul).

Illustratively, every city for which bounds have been determined or will be determined (e.g., as described in FIG. 2) is either associated with a metropolis that is deemed to include the city, or is specifically coded as not being part of any metropolis. The latter condition may be used to help identify boundaries of a metropolis, region, state or other relatively large area, by ensuring the area is not expanded to include cities that don't belong in the area.

Thus, in operation 302, any or all cities for which bounds were (or will be) determined and that are part of a metropolis may be selected to start the process of defining that metropolis' boundaries.

In operation 304, coordinates of each selected city within the selected metropolises are identified, such as the latitude and longitude coordinates of each city's center. And, leaf cells of geographical data that cover each city's coordinates are identified, along with some number of adjacent cells. Illustratively, in the same manner as described above in conjunction with FIG. 2, a 3×3 grid of leaf cells may be selected, preferably with the center cell covering the city's coordinates (especially if those coordinates correspond to the city's center).

In operation 306, the cities' leaf cells are replaced with initial ancestor cells at a default or specified level in the spatial index hierarchy, in order to cover an initial city area of a desired size. The spatial index layer from which initial cells are selected, and the resulting initial city areas may or may not be the same as described above in conjunction with FIG. 2. However, cities' initial cells are selected so that no initial cell is associated with more than one city. All initial cells of cities in one metropolis are considered to be part of, or associated with, that metropolis.

In operation 308, any or all of the cities are tested to determine if any of their initial cells would collide (e.g., overlay, intersect) if replaced with their immediate ancestors. In the illustrated method, a collision occurs if cells of two or more different metropolises (or cells of a metropolis and a city not part of any metropolis) would be replaced with the same ancestor cell.

Therefore, a given cell at level N will not be replaced with its level N−1 ancestor cell if two or more of the N−1 ancestor's descendants belong to different metropolises (or to a metropolis and a city that is not part of any metropolis). More specifically, in this embodiment, any given cell and all of its descendants belong to at most one metropolis.

The size of a metropolis' initial cells may make this occurrence unlikely, especially if the metropolises selected in operation 302 are distant from each other and comprise a close cluster of cities.

In operation 310, each initial cell (e.g., at layer N) that can expand without collision is replaced with the next larger cell (i.e., the cell at layer N−1 that includes the initial cell). Thus, multiple adjacent cells having the same immediate ancestor may be replaced with a single larger cell.

In one implementation, a cell at a given layer that is part of a metropolis (or a set of adjacent cells belonging to the same cell at the next higher layer) also may not be replaced if it is known that the next larger cell comprises no useful geospatial or geographic data not already covered by the existing cells, or no data that is part of the metropolis. For example, if the only content of the next larger cell not covered by existing cells is undefined (e.g., no data available), does not include or is not part of any geographical area of interest, or comprises ocean or some other limiting topographical feature, those existing cells may not be replaced.

Each time cells at one layer of the data tree are to be replaced with cells at the next higher layer, replacements are attempted for all cells of all metropolises at the same layer before moving on to the next round of replacements. This ensures that each metropolis' boundaries are allowed to grow at the same rate.

In operation 312, it is determined whether any of the replacement cells would, if expanded further, collide with a cell associated with a different metropolis or a city that is not part of a metropolis. For example, while determining the boundaries of a San Francisco metropolis, expansion of a cell associated with that metropolis may cause a collision with a cell associated with a San Jose metropolis or a city not part of a metropolis (e.g., Fremont). This indicates that a boundary of the San Francisco metropolis has been located.

Expansion of cells, or replacement of cells with larger cells, may also halt for reasons other than collisions. For example, in one implementation expansion may halt automatically after a given number of iterations of cell replacements even if a collision has not yet occurred. This would prevent a metropolis' bounds from expanding so far that they encompass an unreasonably large area.

In another implementation, expansion or replacement of a cell associated with a metropolis may cease when the other three of its ancestor cell's four immediate descendants are unassigned.

In operation 314, it is determined whether sufficient boundaries have been delimited for all metropolises of interest. In one implementation, when no cells of a particular metropolis can be expanded or enlarged any further (e.g., because they would collide with cells from other metropolises or cities not part of metropolises), then a boundary of that metropolis has been identified. The actual bounds assigned to the metropolis may be derived from an outline of its cells, by a line connecting their midpoints or points of collision, etc.

In one alternative implementation of this embodiment of the invention, bounds of a metropolis may be determined by starting with the bounds of one or more cities within the metropolis, and then expanding or replacing those cities' cells as described previously. A method such as the one described in conjunction with FIG. 2 may be used to identify city bounds. Illustratively, all cells associated with the cities may iteratively be expanded to a common level first (e.g., the highest layer of cell reached while determining the cities' bounds), while testing for collisions, before expanding to a higher layer.

Figure 4:
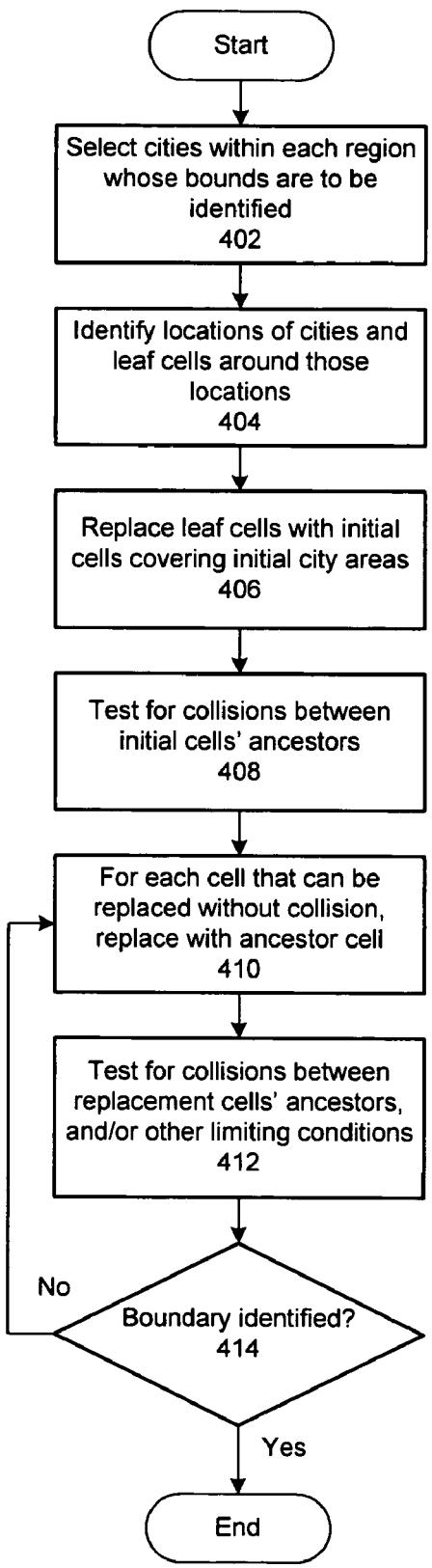
FIG. 4 is a flowchart illustrating a method of determining a boundary of a region in accordance with an embodiment of the invention.

FIG. 4 demonstrates a method of determining regional bounds according to an embodiment of the invention. In this embodiment of the invention, a region corresponds to a state or county in the United States, but may correspond to provinces, cantons, districts or other areas within other countries.

In operation 402, one or more cities and/or metropolises deemed to lie within the bounds of each selected region are identified. Illustratively, every city for which bounds have been determined or will be determined (e.g., as described in FIG. 2), and possibly every metropolis for which bounds have been determined or will be determined (e.g., as described in FIG. 3), is associated with a region that is deemed to include the city (or metropolis), or is specifically coded as not being part of any region. The latter condition may be used to help identify bounds of a regional area by ensuring the area is not expanded to include cities or metropolises not actually part of the region.

Thus, in operation 402, any or all cities for which bounds were determined and that lie within a region may be selected to start the process of defining that region's bounds.

In operation 404, coordinates of each selected city within the selected regions are identified, such as the latitude and longitude coordinates of each city's center. And, leaf cells of geographical data that cover each city's coordinates are identified, along with some number of adjacent cells. Illustratively, in the same manner as described above in conjunction with FIG. 2, a 3×3 grid of leaf cells may be selected, preferably with the center cell covering the city's coordinates (especially if those coordinates correspond to the city's center).

In operation 406, the cities' leaf cells are replaced with initial ancestor cells at a default or specified level in the spatial index hierarchy, in order to cover an initial city area of a desired size. The spatial index layer from which initial cells are selected, and the resulting initial city areas may or may not be the same as described above in conjunction with FIG. 2. However, cities' initial cells are selected so that no initial cell is associated with more than one city. All initial cells of cities in one region are considered to be part of, or associated with, that region.

In operation 408, any or all of the cities are tested to determine if any of their initial cells would collide (e.g., overlay, intersect) if replaced with their immediate ancestors. In the illustrated method, a collision occurs if cells of two or more different regions (or cells of a region and a city or metropolis not part of any region) would be replaced with the same ancestor cell.

Therefore, a given cell at level N will not be replaced with its level N−1 ancestor cell if two or more of the N−1 ancestor's descendants belong to different regions (or to a region and a city or metropolis that is not part of any region). More specifically, in this embodiment, any given cell and all of its descendants belong to at most one region.

In operation 410, each initial cell (e.g., at layer N) that can expand without collision is replaced with the next larger cell (i.e., the cell at layer N−1 that includes the initial cell). Thus, multiple adjacent cells having the same immediate ancestor may be replaced with a single larger cell.

In one implementation, a regional cell at a given layer (or set of adjacent cells belonging to the same cell at the next higher tree layer) also may not be replaced if it is known that the next larger cell comprises no useful geospatial or geographic data not already covered by the existing cells, or no data that is part of the region. For example, if the only content of the next larger cell not covered by existing cells is undefined (e.g., no data available), does not include or is not part of any geographical area of interest, or comprises ocean or some other limiting topographical feature, those existing cells may not be replaced.

Each time cells at one layer of the data tree are to be replaced with cells at the next higher layer, replacements are attempted for all regions' cells at the same layer before moving on to the next round of replacements. This ensures that each region's boundaries are allowed to grow at the same rate.

In operation 412, it is determined whether any of the replacement cells would, if expanded further, collide with a cell associated with a different region or a city (or metropolis) that is not part of a region.

Expansion of cells, or replacement of cells with larger cells, may also halt for reasons other than collisions. For example, in one implementation, expansion may halt automatically after a given number of iterations of cell replacements even if a collision has not yet occurred. This would prevent a region's bounds from expanding so far that they encompass an unreasonably large area.

In another implementation, expansion of a cell associated with a region may cease when the other three of its ancestor cell's four subcells are unassigned.

In operation 414, it is determined whether sufficient boundaries have been delimited for all regions of interest. In one implementation, when no cells of a particular region can be expanded or enlarged any further (e.g., because they would collide with cells from other regions, or with cells of cities or metropolises not part of any region), then a boundary of that region has been identified. The actual bounds assigned to the region may be derived from an outline of its cells, by a line connecting their midpoints or points of collision, etc.

In one alternative implementation of this embodiment of the invention, bounds of a region may be determined by starting with the bounds of one or more cities (and/or metropolises) within the region, and then expanding or replacing those cells as described previously. A method such as the one described in conjunction with FIG. 2 may be used to identify city bounds and a method as described in conjunction with FIG. 3 may be used to identify metropolitan bounds. Illustratively, all cells associated with the cities (and/or metropolises) may iteratively be expanded to a common level first (e.g., the highest layer of cell reached while determining the cities' boundaries), while testing for collisions, before expanding to a higher layer.

Figure 5:
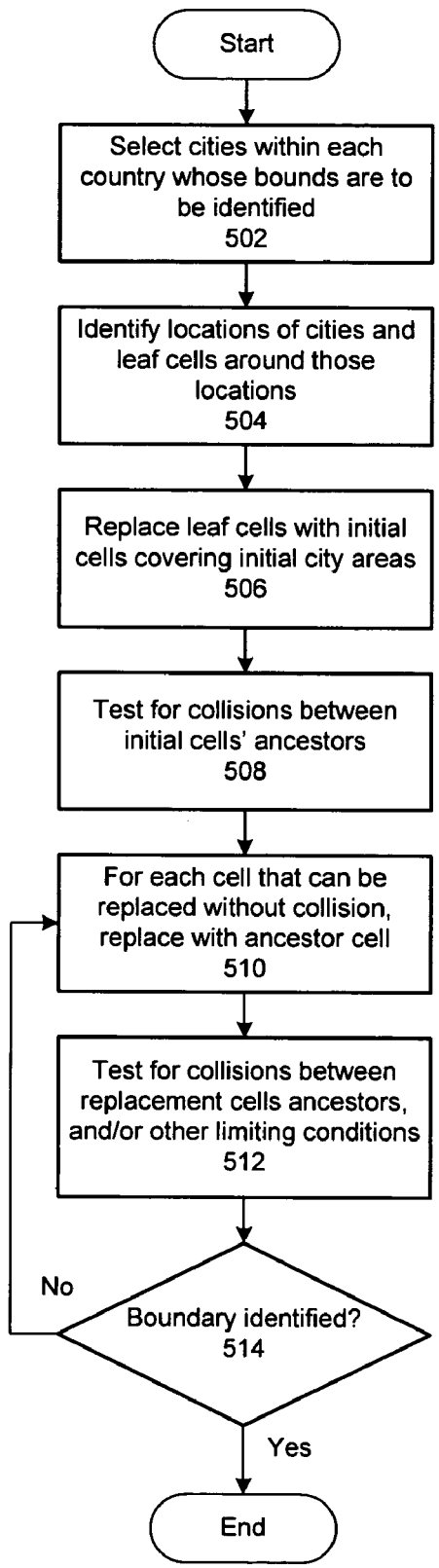
FIG. 5 is a flowchart illustrating a method of determining a boundary of a country in accordance with an embodiment of the invention.

FIG. 5 demonstrates a method of determining bounds of one or more countries, according to an embodiment of the invention.

In operation 502, one or more cities, metropolises and/or regions deemed to lie within the bounds of each selected country are identified. Illustratively, every city, metropolis and region for which bounds have been determined or will be determined is associated with a country that is deemed to include the city, metropolis or region, or is specifically coded as not being part of any country. The latter condition may be used to help identify bounds of a country by ensuring the country is not expanded to include areas not actually part of the country.

Thus, in operation 502, any or all cities and/or other areas (e.g., metropolises, regions) for which bounds were determined and that lie within a country may be selected to start the process of defining that country's bounds.

In operation 504, coordinates of each selected city or other area within the selected countries are identified, such as the latitude and longitude coordinates of each city's center. And, leaf cells of geographical data that cover each city's coordinates are identified, along with some number of adjacent cells. Illustratively, in the same manner as described above in conjunction with FIG. 2, a 3×3 grid of leaf cells may be selected, preferably with the center cell covering the city's coordinates (especially if those coordinates correspond to the city's center).

In operation 506, the cities' leaf cells are replaced with initial ancestor cells at a default or specified level in the spatial index hierarchy, in order to cover an initial city area of a desired size. The spatial index layer from which initial cells are selected, and the resulting initial city areas may or may not be the same as described above in conjunction with FIG. 2. However, cities' initial cells are selected so that no initial cell is associated with more than one city. All initial cells of cities in one country are considered to be part of, or associated with, that country.

In operation 508, any or all of the cities are tested to determine if any of their initial cells would collide (e.g., overlay, intersect) if replaced with their immediate ancestors. In the method of FIG. 5, a collision occurs if cells of two or more different countries (or cells of a country and either a city, metropolis or region not part of any country) would be replaced with the same ancestor cell.

Therefore, a given cell at level N will not be replaced with its level N−1 ancestor cell if two or more of the N−1 ancestor's descendants belong to different countries (or to a country and either a city, metropolis or region that is not part of any country). More specifically, in this embodiment, any given cell and all of its descendants belong to at most one country.

In operation 510, each initial cell (e.g., at layer N) that can expand without collision is replaced with the next larger cell (i.e., the cell at layer N−1 that includes the initial cell). Thus, multiple adjacent initial cells may be replaced with a single larger cell.

In one implementation, a country cell at a given layer (or set of adjacent cells belonging to the same cell at the next higher tree layer) also may not be replaced if it is known that the next larger cell comprises no useful geospatial or geographic data not already covered by the existing cells, or no data that is part of the country. For example, if the only content of the next larger cell not covered by existing cells is undefined (e.g., no data available), does not include or is not part of any geographical area of interest, or comprises ocean or some other limiting topographical feature, those existing cells may not be replaced.

Each time cells at one layer of the data tree are to be replaced with cells at the next higher layer, replacements are attempted for all countries' cells at the same layer before moving on to the next round of replacements. This ensures that each country's bounds are allowed to grow at the same rate.

In operation 512, it is determined whether any of the replacement cells would, if expanded further, collide with a cell associated with a different country or a city (or metropolis or region) that is not part of a country.

Expansion of cells, or replacement of cells with larger cells, may also halt for reasons other than collisions. For example, in one implementation, expansion may halt automatically after a given number of iterations of cell replacements even if a collision has not yet occurred. This would prevent a country's bounds from expanding so far that they encompass an unreasonably large area.

In another implementation, expansion of a cell associated with a country may cease when the other three of its ancestor cell's four subcells are unassigned.

In operation 514, it is determined whether sufficient boundaries have been delimited for all countries of interest. In one implementation, when no cells of a particular country can be expanded or enlarged any further (e.g., because they would collide with cells from other countries, or areas not part of any country), then a boundary of that country has been identified. The actual bounds assigned to the country may be derived from an outline of its cells, by a line connecting their midpoints or points of collision, etc.

In one alternative implementation of this embodiment of the invention, bounds of a country may be determined by starting with the bounds of one or more cities (and/or metropolises and regions) within the country, and then expanding or replacing those cities' cells as described previously. A method such as the one described in conjunction with FIG. 2 may be used to identify city bounds; a method as described in conjunction with FIG. 3 may be used to identify metropolitan bounds; a method as described in conjunction with FIG. 4 may be used to identify regional bounds.

Illustratively, all cells associated with the cities (and/or metropolises and regions) may iteratively be expanded to a common level first (e.g., the highest layer of cell reached while determining the cities' bounds), while testing for collisions, before expanding to a higher layer.

Embodiments of the invention for determining bounds of cities, metropolises, regions and countries have now been described with reference to FIGS. 2-5. In another embodiment of the invention, a single method may be employed to determine bounds of multiple types of areas. Illustratively, starting with city coordinates and initial city cells, cells are repeatedly replaced with the encompassing cell of the next higher layer until all areas' bounds are identified.

As the cells get larger and larger, first city bounds are identified, then metropolitan, regional and country bounds. Each area's bounds may be detected through collisions with other cities/metropolises/regions/countries, through collisions with bodies of water, through collisions with unassigned cells or areas having no useful geographic data, through a fixed level or number of expansions, etc.

In an embodiment of the invention, a void cell, zone or point may be defined to encompass a location for which no geographic or geospatial data is available or a geographic or topographic feature at which cell expansion/replacement should halt (e.g., an ocean). Thus, testing for an intersection between a cell associated with one area (e.g., city, metropolis, region, country) and cells of other areas may also involve testing for intersection (or adjacency) with a void cell. A void cell may be of any size and may therefore be found at any layer of a hierarchy of geographic or geospatial data cells. The set of cells that comprise, define or delineate an area may be termed the area's cell covering.

As described previously, a hierarchical spatial index may be constructed to reflect the entire cell division scheme, from layer 0 (e.g., the earth) or layer 1 (e.g., the projection of a cube onto the earth's surface) to as low a level as is desired. In one embodiment of the invention, approximately 30 layers of cells are defined.

Each node in the spatial index corresponds to one cell of the cell division scheme. The index may be constructed sparsely, meaning that nodes are generated only when and as the corresponding cells are needed.

All geographic areas of interest (e.g., the cities, metropolises, regions and countries for which bounds are determined) are represented by a finite set of cells, with each cell corresponding to one index node. Each node has a list of geographic areas that overlap or include its corresponding cell.

Given a point of latitude/longitude, the leaf cell that overlaps the point can be determined quickly. From that cell, its ancestor cells can be easily identified by reference to the index. The union of the leaf cell and its ancestors yields all geographic areas that intersect the point.

As described in a following section, this procedure can be used to help determine what areas intersect a user's view port.

Determining Overlap Between a Target Area and a View Port

In an embodiment of the invention, a method is provided for efficiently determining whether, and possibly how much, a target geographical area overlaps a map view or view port that is (or will be) served to a user.

An implementation of this embodiment of the invention may be used to determine whether a user's view port intersects a target geographical area in which, or for which, an advertiser has paid to place advertisements. In particular, an advertiser may specifically request an ad be served with maps or view ports within target cities, metropolises, regions (e.g., counties, states), countries or other areas. By determining which target areas overlap a particular view port, appropriate ads can be identified for serving with the view port.

In this embodiment, by defining a set of points or zones within the view port, tests for intersection can be performed quickly and efficiently. In particular, testing for an intersection between a number of areas and a point is faster than testing for intersections between a number of areas and another area.

In one particular implementation, the extent or amount of overlap between a view port and an advertiser's target area(s) may determine whether the advertiser's ad is served and/or its priority (e.g., the order or position in which it is served with or among other ads). More specifically, if an ad's target area overlaps the view port only a relatively small amount (e.g., less than 10% or 25% of the view port), the ad may not be served or may be served with relatively low priority. For example, if the user's view port encompasses the entire United States, an ad targeting one or even a few specific cities in the United States may not be served.

Conversely, if an ad's target area significantly overlaps the view port (e.g., by more than 50%), then the ad may be served and may also be awarded relatively high priority or prominence. For example, if a user's view port encompasses the metropolitan San Francisco area, an ad targeting the city of San Francisco or the state of California may be served.

A method of determining bounds or boundaries of geographical areas described in the previous section may be used to help determine whether an advertisement targeting such an area overlaps or intersects a given view port, by providing an easily manipulated definition of a target area.

However, target areas of advertisements are not limited to the types of areas addressed in the previous section (i.e., city, metropolis, region, country). A target area may be a circle defined by a set of latitude/longitude coordinates plus a radius, a geographic cell as described in the previous section, a series of vectors, or virtually any other area.

Figure 6:
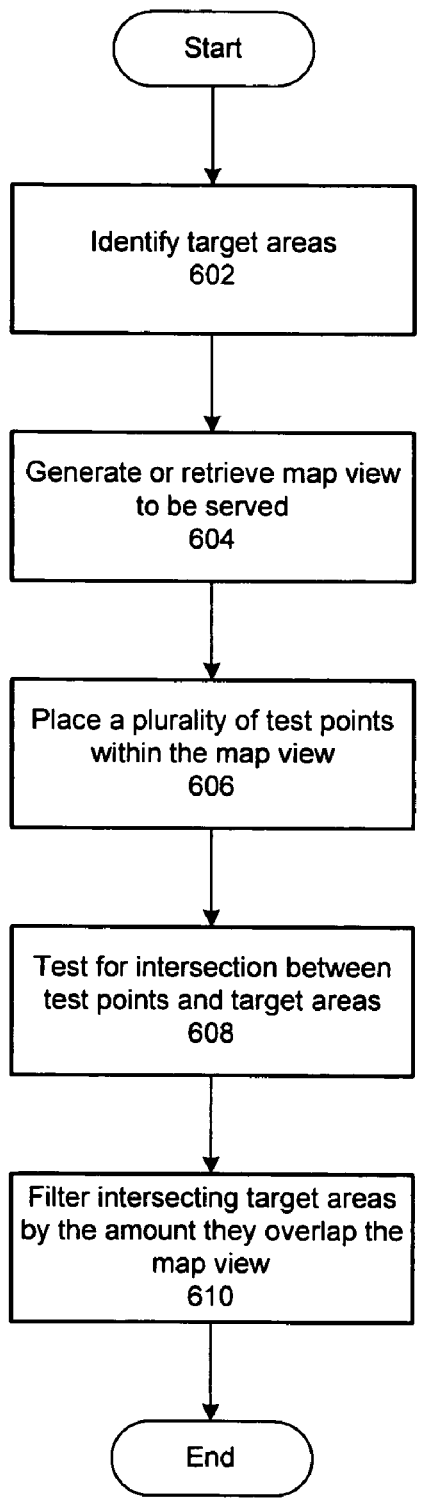
FIG. 6 is a flowchart illustrating a method of identifying target geographical areas that significantly overlap a view port of a map, according to an embodiment of the invention.

FIG. 6 demonstrates a method of determining overlap between a map view or view port of a map, or some other view of geographical data, and one or more target geographical areas. A target geographical area may be the target of a particular advertisement or advertiser, a focus of research or an investigation, or may be targeted for some other reason (e.g., polling, surveys).

In operation 602, a set of target areas is identified (e.g., all areas associated with advertisements or other information to be served with map views). The targeted geographical areas may be delineated or defined by a set of cells overlaying the area, by a circle centered on some target (e.g., an address, a city's coordinates), or by some polygon described by vectors, latitude/longitude coordinates or other means (e.g., zip code, area code).

In one implementation, target geographical areas are loaded into a spatial index when mapping system 110 (or ad server 120) of FIG. 1 is booted, meaning that the nodes of the index identify which (if any) target areas their corresponding geographic cells lie within. The spatial index may be constructed as described in the preceding section, or may be loaded from storage after having been constructed earlier. Thus, for each target area, a set of geographic cells encompassing the area is easily identified by referring to the spatial index.

In operation 604, a map view is generated or retrieved, possibly using parameters from a user. Illustratively, a map view may be generated in response to a user's submission of some parameters, such as a name of a known area (e.g., a city, a metropolis, a region, a country), an address, a pair of latitude and longitude coordinates, etc. A map view may then be selected based on the parameters.

The resolution of the view may depend on the level of detail inherent in the user's specified parameters. For example, if the user simply names a city, the map view may encompass all or most of the bounded area of the city (e.g., as determined by the method illustrated in FIG. 2). If she gives a specific address, the map view may focus on a portion of the city that includes the address (e.g., a cell or set of cells that encompass the address). Regardless of the resolution, the area displayed within the map view is readily determined by latitude/longitude coordinates, vectors, other spatial coordinates, etc.

In operation 606, a set of points is overlaid upon the map view, or invisibly placed within it. In one implementation the points are equally or fairly equally distributed within the map view. Many possible distributions are envisioned, especially if the map view is rectangular, as is the case with most existing display devices.

In the embodiment of the invention reflected in FIG. 6, points are placed within or upon a map view in such a way that any target geographical area that overlaps the map view a significant or meaningful amount will intersect at least a threshold number (e.g., one) of the points. Because most target areas may be relatively centric and dense (e.g., circular, rectangular), depending on the number and distribution of points, only areas that have minimal overlap with the map view may be able to overlap without intersecting at least one point.

Figure 7:
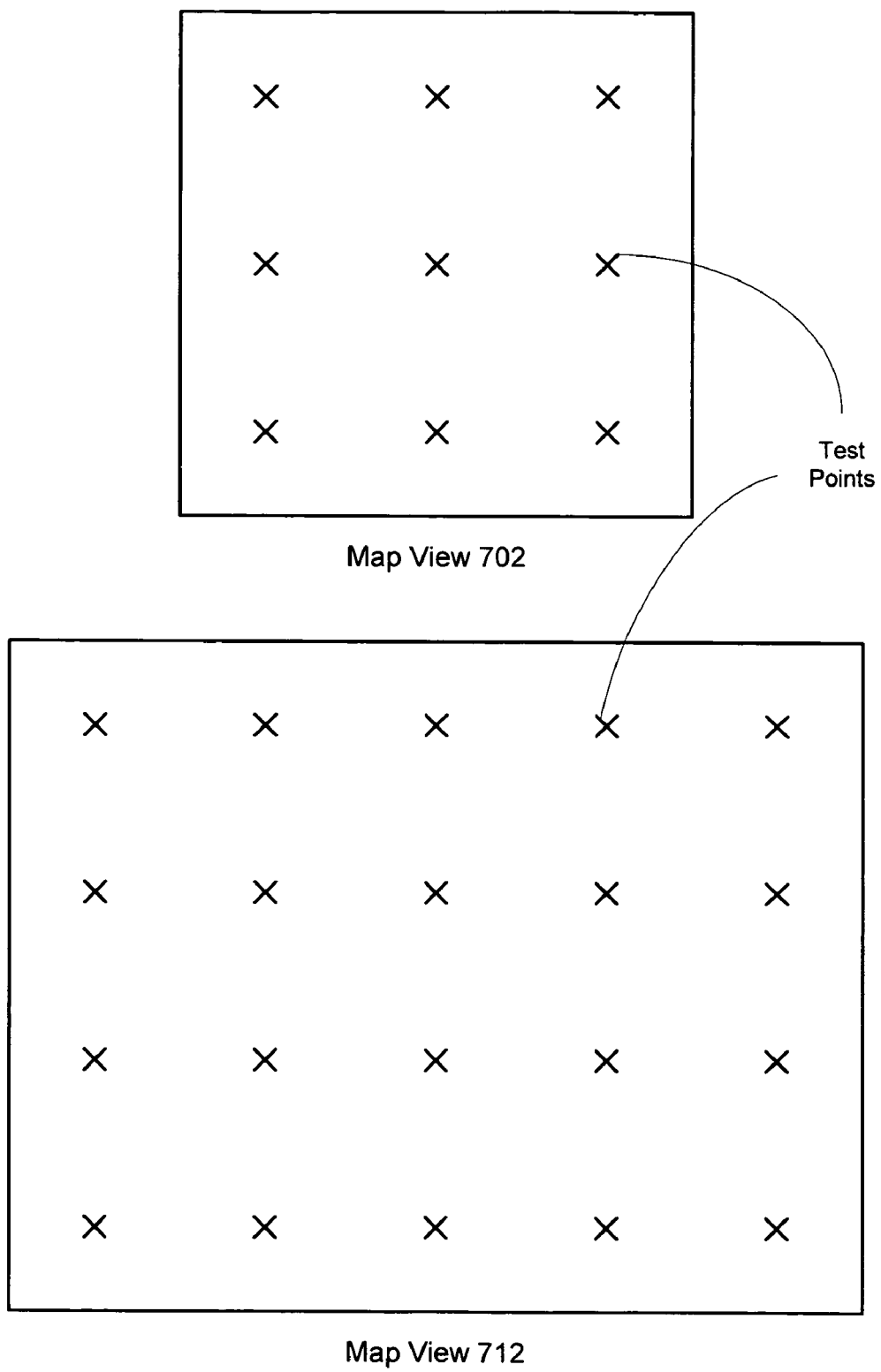
FIG. 7 depicts illustrative placements of test points for determining whether a target geographical area overlaps a view port of a map, according to an embodiment of the invention.

FIG. 7 demonstrates illustrative distributions of points within a map view. Map view 702 demonstrates the even distribution of 9 test points within one map view. Similarly, map view 712 demonstrates the distribution of 20 test points within another map view.

In different implementations, different numbers of points may be placed and may be placed in various patterns, depending on the dimensions and size of the map view, the smallest overlap that is deemed significant, and/or other factors.

In operation 608, tests for intersections are performed between some or all points and some or all target areas. In one implementation, the spatial index is queried for each test point, to determine which (if any) target areas intersect the point. As described above, a leaf cell that overlaps a given point can be quickly identified. The spatial index node that corresponds to that leaf cell will have a list of all target areas that include the leaf cell.

Operation 608 thus yields a set of target areas that overlap at least one of the test points. These target areas may all be candidates for having associated information (e.g., advertisements, notices, warnings) served with the map view.

In operation 610, the set of target areas that intersect at least one test point are filtered to eliminate areas that only minimally overlap the view port.

In particular, in this embodiment of the invention, an advertisement or other information associated with a target area may not be served unless the target area overlaps at least a threshold amount of the map view (e.g., 10%, 25%, 3 of 9 points, 5 of 20 points). The information that is served may be prioritized based on the amount of overlap of different target areas, to determine the order in which the information should be listed, where it should be positioned, the size or other attribute of the information (e.g., font, color, text or image).

Selecting Targeted Messages Based on a Map View Port

In an embodiment of the invention, a system and method are provided for selecting one or more targeted advertisements or other information for presentation to a user in conjunction with an electronic map view port. Although implementations of this embodiment for selecting targeted advertisements are described below, one skilled in the art will appreciate that other types of messages, announcements, notices, warnings, and so on, may be selected in other implementations.

In this embodiment of the invention, advertisers describe or select target areas for their advertisements. The areas may be predefined, such as cities, metropolises, regions and countries for which bounds are determined in an embodiment of the invention described in a previous section. Or, a target area may be defined as a circle having a center (e.g., an address, a city, a latitude/longitude coordinate) and a radius (e.g., 10 miles, 30 miles), a polygon (e.g., defined as a set of vectors, a connected set of latitude/longitude coordinates) or in some other manner.

An advertisement's target area is used to determine whether or when to serve the advertisement to a user. In particular, the advertisement may be served with map view ports that intersect the target area in a significant manner. In different implementations, a "significant" intersection may be defined differently. In one implementation, a view port significantly intersects a target area if they intersect and the intersection comprises at least a threshold percentage of the area of the view port, such as 10%, 25%, 40%, etc. The amount or percentage of overlap may be used as an indicator of the ad's relevance.

In another implementation, a view port significantly intersects a target area if the target area intersects at least a threshold number of test points within the view port, as described in the preceding section.

In order for an advertisement to be served with a user's view port, however, it may not be enough for the advertisement's target area to significantly intersect the view port. It may also be necessary for the advertisement to match any query terms, search terms, keywords or other criteria (if any such criteria exist). Such criteria may be specified by a user or selected by the system serving the view port or advertisements for the view port.

Figure 8:
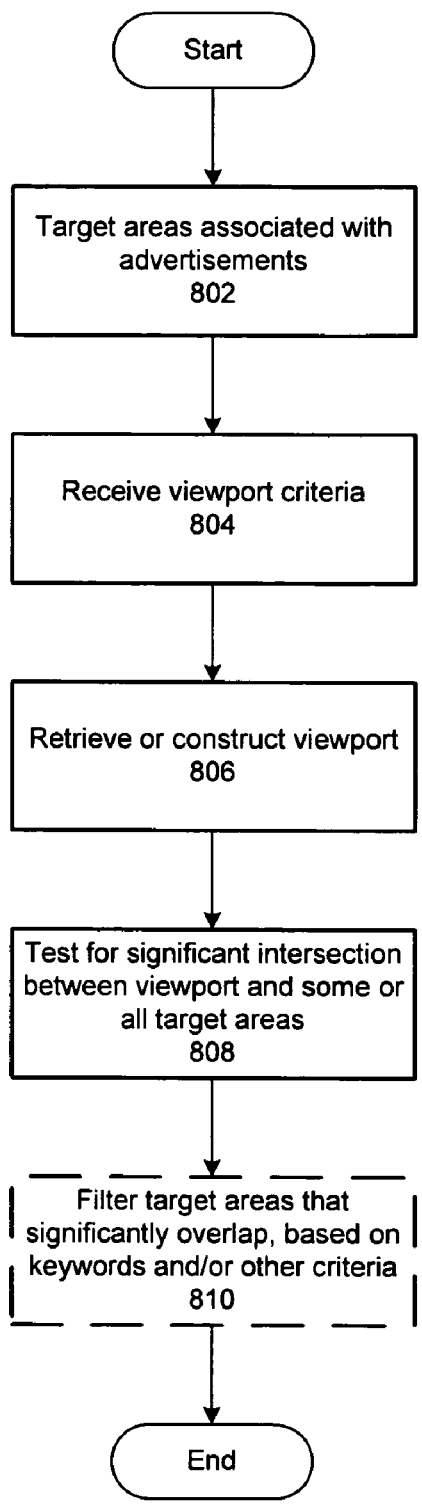
FIG. 8 is a flowchart demonstrating a method of selecting targeted advertisements for display with a map view port, according to an embodiment of the invention.

FIG. 8 demonstrates a method of selecting advertisements for serving with a map view port based on whether and how much the advertisements' target areas intersect or overlap the view port, according to one embodiment of the invention.

The method of FIG. 8 may be preceded by implementation of an embodiment of the invention described in conjunction with any or all of FIGS. 2-5, to determine bounds of various geographic areas. As described below, when one of these geographic areas is specified as an advertisement's target area, knowledge of the area's bounds and the area's cell coverage may facilitate a determination of whether the area intersects a given view port.

In operation 802 of the method illustrated in FIG. 8, advertisers associate their ads with one or more target areas. Illustratively, for each advertisement, an advertiser may select one or more predefined areas (e.g., cities, metropolises, regions, countries) as target areas, or may describe an area of interest as a circle having a center (e.g., a city, an address) and a radius or in some other manner.

The advertisers may also provide keywords, search terms or other query filters for determining whether their advertisements are relevant to a user's query (e.g., for "hotels" or "restaurants"). Such query filters are not required, however, as an advertiser may want an advertisement shown to all users receiving a view port of a particular area, not just a subset of those users that enter matching search terms.

In operation 804, parameters or criteria are received for selecting or generating a view port to be served to a user. In one implementation, the parameters are received from the user, such as when he or she requests a map view of an address or area. The parameters include or imply at least one of a city, metropolis, region (e.g., county, state, province) or country, but may also include a specific address, an airport name or identifier, and/or other information from which a map view port can be selected.

In operation 806, a view port to be served to the user is retrieved or generated. Illustratively, if the user requests a known or common view port (e.g., a map of a popular city or region), a pre-constructed view port may be retrieved from storage. Or, the view port may be dynamically generated based on the user's parameters, size and/or resolution of the user's display device, etc., usually virtually any type of map data (e.g., rendered, satellite imagery, aerial imagery).

In operation 808, some or all known target areas (e.g., target areas of all known ads having target areas) are compared to the view port to determine whether and/or how much they overlap.

In one implementation, all advertisements' target areas are compared to the view port. In another implementation, advertisements whose target areas cannot overlap are not considered. For example, if the user requests a view of California or a metropolis or city within California, target areas wholly contained within other states and within countries other than the United States may be eliminated from consideration without testing for overlap.

In another implementation, overlaps may be predetermined. For example, for a popular view port and advertisements not limited by search terms (or limited only by popular search terms), overlaps may be determined ahead of time and stored.

In the illustrated embodiment of the invention, advertisements whose target areas do not significantly overlap the view port are eliminated from consideration for serving with the view port. In this embodiment, a significant intersection requires a target area to cover or comprise at least 25% of the area of the view port. The percentage of overlap may be calculated in different ways in different implementations of this embodiment.

In one implementation, a method described in the preceding section is employed to identify target areas that overlap at least a threshold percentage (e.g., 25%). In that method, a plurality of test points is distributed within the view port. Then, instead of testing for intersections between two two-dimensional areas (i.e., the view port and a target area), simpler comparisons are made between individual test points (all or a subset of the points) and a target area. The test points may be distributed such that if a target area overlaps a threshold number of the points (e.g., 1, 2, 3) it is likely that the target area significantly intersects the view port; a more exact comparison may or may not be calculated.

In optional operation 810, the set of advertisements whose target areas significantly intersect the view port is filtered based on the user's query terms (e.g., keywords).

After operation 810, the view port and any number of advertisements are served to the user. The advertisements that are served have been determined to significantly overlap the view port, and may match the user's query terms, if any.

The advertisements served with the view port may be prioritized based on how significantly their target areas overlap the view port and/or the degree to which they match the query terms. For example, the more an advertisement's target area overlaps the view port, the higher priority the advertisement may be awarded. An advertisement's priority may affect how or where the advertisement is served, such as its location or ranking on the user's display, or its size, font, color or other attribute.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk, DVD) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of identifying boundaries of a geographic area comprising a city, the method comprising:
    (a) identifying coordinates of multiple cities;
    (b) associating with each city a grid of cells of geographic data encompassing the city's coordinates;
    (c) for each cell associated with a city, identifying a larger replacement cell of geographic data encompassing the cell;
    (d) testing for intersection between replacement cells of cells of different cities;
    (e) for each cell whose replacement cell does not intersect another replacement cell of another cell of another city, replacing the cell with the replacement cell and associating the replacement cell with the city;
    (f) repeating (c)-(e) to replace replacement cells with further replacement cells until:
        (1) no cell associated with a city can be replaced without the replacement cell intersecting a replacement cell associated with a different city; or
        (2) said (e) has been performed a threshold number of times; or
        (3) an area covered by cells associated with the city meets a threshold size; and
    (g) using said replacement cells to define a boundary of the geographic area;
    wherein the method is implemented in a computer system that comprises a process and a memory.

2. The method of claim 1, wherein a replacement cell intersects another replacement cell if the replacement cell and the other replacement cell are the same cell.

3. The method of claim 1, wherein said (d) further comprises testing for intersection between a replacement cell of a cell associated with a city and a replacement cell associated with a geographic area that does not include the city.

4. The method of claim 1, wherein said (d) further comprises testing for intersection between a replacement cell of a cell associated with a city and a void cell.

5. The method of claim 4, wherein a void cell is a cell encompassing a body of water that is not part of the geographic area.

6. The method of claim 4, wherein a void cell is a cell whose geographic data is substantially devoid of land.

7. The method of claim 4, wherein a void cell is a cell comprising null geographic data.

8. The method of claim 4, wherein a void cell is a cell comprising less than a threshold of geographic data.

9. The method of claim 1, wherein:
    said identified coordinates are latitude/longitude coordinates of the cities; and
    said grid comprises leaf cells of a hierarchical tree of cells of geographic data.

10. The method of claim 9, wherein said associating a grid of cells comprises:
    identifying within the hierarchical tree a first leaf cell whose geographic data encompass the city's coordinates; and
    identifying additional leaf cells whose geographic data are adjacent to the geographic data of the first leaf cell.

11. The method of claim 9, wherein a replacement cell of a cell associated with a city is the immediate ancestor of the cell within the hierarchical tree.

12. The method of claim 1, further comprising:
    maintaining a spatial index comprising multiple hierarchical layers of nodes;
    wherein each node corresponds to a cell within a hierarchical tree of cells of geographic data, and is configured to identify a geographic area comprising the cell.

13. A computer readable medium storing instructions that, when executed by a computer, cause the computer to perform a method of identifying boundaries of a geographic area comprising a city, the method comprising:
    (a) identifying coordinates of multiple cities;
    (b) associating with each city a grid of cells of geographic data encompassing the city's coordinates;
    (c) for each cell associated with a city, identifying a larger replacement cell of geographic data encompassing the cell;
    (d) testing for intersection between replacement cells of cells of different cities;
    (e) for each cell whose replacement cell does not intersect another replacement cell of another cell of another city, replacing the cell with the replacement cell and associating the replacement cell with the city;
    (f) repeating (c)-(e) to replace replacement cells with further replacement cells until:
        (1) no cell associated with a city can be replaced without the replacement cell intersecting a replacement cell associated with a different city; or
        (2) said (e) has been performed a threshold number of times; or
        (3) an area covered by cells associated with the city meets a threshold size; and
    (g) using said replacement cells to define a boundary of the geographic area;
    wherein the method is implemented in a computer system that comprises a processor and a memory.

14. A method of determining boundaries of a geographical area comprising a city, the method comprising:
    identifying coordinates of the city;
    associating with the city a grid of cells of geographical data, wherein the grid encompasses the city coordinates;
    repeatedly expanding each cell associated with the city and associating the expanded cell with the city until:
        the expanded cell cannot be expanded without intersecting a cell associated with a different geographical area; or
        said expanding has been performed a threshold number of times; and
    defining a boundary of the city using the cells associated with the city;
    wherein the method is implemented in a computer system that comprises a processor and a memory.

15. The method of claim 14, further comprising:
    (a) discarding the expanded cells;
    (b) repeating said identifying, said associating and said repeatedly expanding for one or more cities within the geographic area, including the city; and (c) defining a boundary of the area using the cells associated with the one or more cities.

16. The method of claim 14, further comprising:
identifying coordinates of one or more additional cities within the geographical area;
associating with each additional city a grid of adjacent cells of geographical data, wherein the grid encompasses the additional city's coordinates;
expanding each cell associated with each additional city and associating the expanded cell with the additional city until:
the expanded cell cannot be expanded without intersecting a cell associated with a different geographical area; or
said expanding has been performed a threshold number of times; and
defining a boundary of the geographical area using the cells associated with the city.

17. The method of claim 14, wherein said defining comprises defining the boundary from a perimeter of cells associated with the city.

18. The method of claim 14, wherein said expanding each cell associated with the city stops when an area encompassed by all cells associated with the city exceeds a threshold size.

19. The method of claim 14, wherein said expanding each cell associated with the city stops when an expanded cell would intersect a void cell.

20. The method of claim 19, wherein a void cell is a cell comprising less than a threshold amount of land geographical data.

21. The method of claim 19, wherein a void cell is a cell comprising a body of water not part of the geographical area.

22. The method of claim 19, wherein a void cell is a cell not associated with any geographical area.

23. The method of claim 14, further comprising, prior to said associating:
(a) subdividing a larger geographical area comprising multiple geographical areas, including the geographical area, into a plurality of level 1 cells of geographical data;
(b) subdividing each said level 1 cell into an equal number of level 2 cells;
(c) repeating said (b) for N−2 additional levels (N>2), to subdivide each said level 2 cell into a plurality of level N cells;
wherein said adjacent cells are selected from said level N cells.

24. A computer readable medium storing instructions that, when executed by a computer, cause the computer to perform a method of determining boundaries of a geographical area comprising a city, the method comprising:
identifying coordinates of the city;
associating with the city a grid of adjacent cells of geographical data, wherein the grid encompasses the city coordinates;
repeatedly expanding each cell associated with the city and associating the expanded cell with the city until:
the expanded cell cannot be expanded without intersecting a cell associated with a different geographical area; or
said expanding has been performed a threshold number of times; and
defining a boundary of the city using the cells associated with the city;
wherein the method is implemented in a computer system that comprises a processor and a memory.

25. A system for determining boundaries of a geographic area, comprising:
a spatial index comprising multiple layers of nodes, each node corresponding to a cell of geographic data, wherein each cell at a layer M−1 comprises multiple layer M cells (M>1);
a boundary generator configured to:
receive coordinates of a point within the geographic area;
associate with the geographic area a set of layer N cells (N>2) encompassing said coordinates;
iteratively replace the identified cells with encompassing cells at layer N−1 until:
an encompassing cell intersects a terminating cell; or
a threshold number of replacement iterations has been performed; and
identify a boundary of the geographical area from the encompassing cells;
wherein a terminating cell is:
a cell encompassing a cell associated with a different geographic area; or
a cell encompassing unassigned geographic data.

26. The system of claim 25, further comprising:
a first server configured to serve a map view that intersects the geographic area; and
a second server comprising a set of target areas associated with information to be served with maps intersecting the target areas, wherein the target areas include the geographic area.

27. The system of claim 26, wherein each node of said spatial index comprises identities of target areas encompassing the corresponding cell of geographic data.

28. The system of claim 26, wherein the second server further comprises the information to be served.

29. The system of claim 25, wherein an intersection of the geographic areas of the cells of geographic data corresponding to all nodes of said spatial index comprises the earth's surface.

* * * * *

UNITED STATES PATENT AND TRADEMARK OFFICE
CERTIFICATE OF CORRECTION

| | | |
|---|---|---|
| PATENT NO. | : 7,576,754 B1 | |
| APPLICATION NO. | : 11/399949 | |
| DATED | : August 18, 2009 | |
| INVENTOR(S) | : Joshy Joseph et al. | |

It is certified that error appears in the above-identified patent and that said Letters Patent is hereby corrected as shown below:

In claim 1 (at column 19, line 42), please replace the word "process" with the word --processor--.

Signed and Sealed this

Thirteenth Day of October, 2009

David J. Kappos
*Director of the United States Patent and Trademark Office*